United States Patent Office 3,761,447
Patented Sept. 25, 1973

3,761,447
POLYTHIAZOLES AND METHOD OF PREPARATION FROM DIPHENOLS AND DIHALIDE DIBENZOTHIAZOLIC COMPOUNDS
Christian Blaise, Jarville, Pierre Lochon, Nancy, and Jean Neel, Villers les Nancy, France, assignors to Societe Anonyme dite: Aquitaine Total Organico, Courbevoie, France
No Drawing. Filed Aug. 4, 1971, Ser. No. 169,136
Claims priority, application France, Aug. 7, 1970, 7029213
Int. Cl. C08g 33/02
U.S. Cl. 260—49                 10 Claims

ABSTRACT OF THE DISCLOSURE

New polycondensates resulting from the condensation of dibenzothiazolic dihalogenated derivative A with biphenols B with the general formula

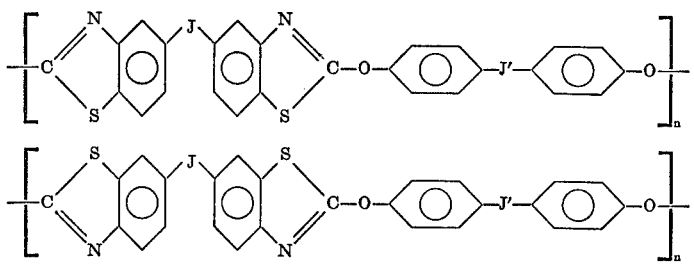

where J and J' are junctions which may be selected from the following list:

a simple covalent bond;
a bivalent atom such as —O—, —S—, —Se—;
a bivalent group such as

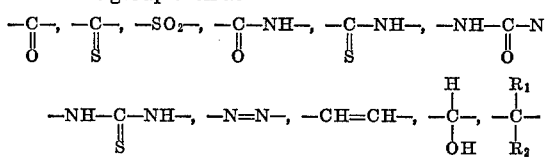

where $R_1$ and $R_2$ are hydrogen atoms or aliphatic, alicyclic or aromatic radicals.

A process for synthesizing these polycondensates, consisting of heating an equimolecular mixture of A and B, dissolved in an anhydrous, inert solvent, to between 130 and 180° C., in the presence of an excess of acid acceptor, under strictly anhydrous conditions and in a nitrogen atmosphere for 100 to 150 hours, while being stirred vigorously.

The application of these polycondensates to the preparation of films and varnishes.

The invention concerns the synthesis of new heat-stable polycondensates, endowed with sufficient mechanical tenacity and solubility to enable them to be used as films, or in the composition of varnishes.

These polymers are obtained from halogenated derivatives of dibenzothiazolic compounds A with the following general Formulae, I and II:

(I)
Dibenzothiazolic derivative with 5,5' junction

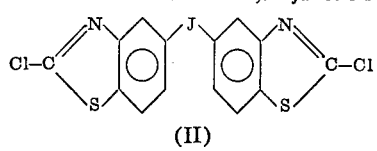

(II)
Dibenzothiazolic derivative with 6,6' junction

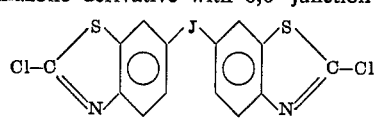

where J is a covalent bond or one of the following groups:
—O—, —S—, —Se—,

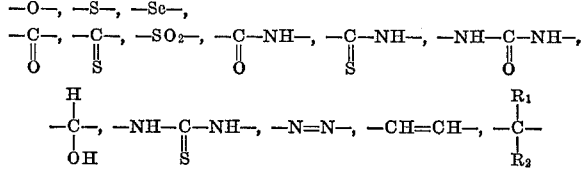

where $R_1$ and $R_2$ may be hydrogen atoms or aliphatic, alicyclic or aromatic radicals.

According to the invention, the Compounds I and II are polycondensed with bifunctional additional reagents B, the molecule of which contains two nucleophilic sites, such as biphenols, diamines, bimercaptans and bithiophenols.

In the case of biphenols with Formula III below, polymers of high thermal stability are obtained, with sufficient mechanical tenacity and solubility to enable them to be used as films, or in the composition of varnishes.

(III) 

The bivalent junction J' is selected from the same list as J.

The polycondensates obtained in accordance with the present invention have the following general formulae:

(IV)
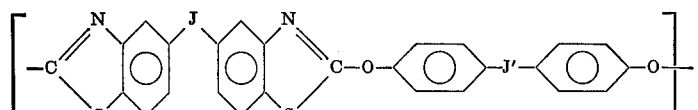

(V)
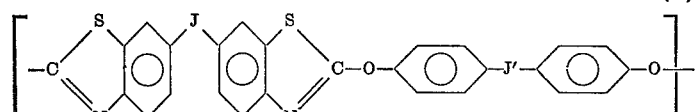

The process according to the present invention consists of carrying out polycondensation, in which a reaction is produced by heating, in the presence of an acid acceptor, an equimolecular mixture of the dichlorinated derivative (I or II) A and the reagent B, both compounds having first been dissolved in an anhydrous solvent with high boiling point.

The monomers used must be purified carefully by recrystallization in suitable solvents, dried, and tested by chromatography on a layer of silica or alumina.

Dichlorinated dibenzothiazolic derivatives A with Formulae I or II include the following examples:

Formula I (J= —$SO_2$—)

5,5'-bi-(2-chloro benzothiazolyl) sulphone, melting point after recrystallization in cyclohexanone and chloroform 262° C.;

Formula II (J=covalent bond)

6,6'-bi-(2-chloro benzothiazolyl), melting point after recrystallization in cyclohexanone, chloroform or dioxan 232° C.;

Formula II (J= —$SO_2$)—)

6,6'-bi-(2-chloro benzothiazolyl) sulphone, melting point after recrystallization in white spirit and benzene 258° C.;

Formula II (J= —O—)

melting point after recrystallization in heptane or a water-alcohol mixture 109° C.

Derivatives B with Formula III include the following examples:

Formula III (J'=covalent bond)

4,4'-dihydroxy biphenyl, melting point after recrystallization in a 10/100 water-alcohol mixture 275° C.;

Formula III 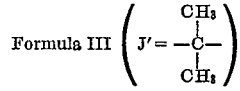

4,4'-dihydroxy 2,2-diphenyl propane, melting point after recrystallization in toluene 158° C.;

Formula III (J'= —$SO_2$—)

4,4'-dihydroxy diphenylsulphone, melting point after recrystallization in water 248° C.

The reaction solvent must also be strictly anhydrous. This result can be obtained by subjecting it to azeotropic distillation after adding benzene or toluene, or by contact with an energetic drying agent. Solvents with a high boiling point are generally used, belonging either to the category of hydrocarbons (dekaline, tetraline, o-xylene, pseudocumene, mesitylene), or that of aprotic liquids (dimethylsulphoxide, o-dimethoxybenzene, anisol, diglime, triglime, tetramethylene sulphone, hexamethylphosphorotriamide).

The acid acceptor added to facilitate the reaction may be a tertiary organic amine of low volatility, but it is better to use an oxide or anhydrous basic inorganic salt such as an alkaline or alkaline-earth carbonate or metaborate, in powder form.

Polycondensation is performed as follows.

2.5 m./moles of the reagent B, 2.5 m./moles of the dichlorinated reagent A (I or II), and 150 ml. of solvent are placed in turn in a 250 ml. reactor equipped with a mechanical stirring device, surmounted by a cooler protected from atmospheric humidity by a tube containing a drying agent, and inside which a flow of nitrogen is maintained.

The appliance is heated to 100° C. for sufficient time to allow the mixture to become homogeneous. The acid acceptor is then added, in considerable excess in relation to the amount needed to neutralize the acid produced by the reaction. Two to five times the theoretical quantity is normally used.

The mixture, stirred vigorously, is then heated to above 140° C. for between 100 and 150 hours. The polycondensate forms gradually, and begins to precipitate after about 48 hours. At the end of the operation, the solid is isolated, extracted with boiling water and washed with acetone or alcohol. This produces a white polymer, which is vacuum-dried at 150° C.

The following examples, given to illustrate the present invention, contain some additional explanation, referring to each individual case. Among these details, inherent viscosities $\eta_{inh.}$ are expressed in ml. g.$^{-1}$, and correspond to measurements taken at 25° C., using solutions obtained by dissolving 500 mg. of the polymer being examined in 100 ml. of dichloracetic acid. The thermal stability of the different polycondensates was assessed by differential thermal analysis, operating in the presence of air, using the apparatus, type $M_2$, constructed by the French National Scientific Research Centre, the Centre National de la Recherche Scientifique, set so as to ensure a temperature rise of 100° C. an hour. The recording obtained is characterized by two temperatures selected in the part of the line describing the thermal degradation of the sample. The first is defined by the intersection of the axis of the abscissae and the tangent taken to the point of inflexion situated in the upward part of the outline, and the second corresponds to the maximum point on the curve. These two temperatures indicate the lower and upper limits, respectively, of what is referred to as the thermal decomposition zone.

These details are shown in Table 1, which also gives the applications of the products examined, which may be used in the form of films, or in the composition of varnishes. These films, which are usually obtained by allowing a collodion, produced by dissolving the polymer in dichloracetic acid, to evaporate, are transparent and colourless.

Generally, such polycondensates are of high thermal stability, decomposing in air only above 400° C. They dissolve only in a small number of very active solvents, such as dichloracetic acid and certain phenols. Finally, they have extremely useful mechanical tenacity when used in the form of film or varnish.

The invention is illustrated by the following examples.

EXAMPLE 1

Polycondensation of 6,6'-bi-(2-chloro benzothiazolyl) sulphone (Formula II, where J= —$SO_2$—) with 4,4'-dihydroxy diphenylsulphone (Formula III, where J'= —$SO_2$—).

1002 mg. of 6,6'-bi-(2-chloro benzothiazolyl) sulphone and 625 mg. of 4,4'-dihydroxy diphenylsulphone are polycondensed, at 145° C., in o-dimethoxybenzene, in the presence of powdered anhydrous sodium carbonate (2½ times the amount theoretically needed to neutralize the hydrochloric acid produced), and produce 1100 mg. (73% yield) of the required polycondensate, in the form of a white, film-forming polymer with an inherent viscosity of 77 ml. g.$^{-1}$, and the thermal decomposition zone of which lies between 420 and 530° C.

EXAMPLE 2

Polycondensation of 6,6'-bi-(2-chloro benzothiazolyl) sulphone (Formula II, where J= —$SO_2$—) with 4,4'-dihydroxy 2,2-diphenyl propane (Formula III, where J'=

1002 mg. of 6,6'-bi-(2-chloro benzothiazolyl) sulphone and 570 mg. of 4,4'-dihydroxy 2,2-diphenyl propane are polycondensed at 155° C. in pseudocumene, in the presence of anhydrous sodium carbonate (twice the amount theoretically needed), and produce 1200 mg. (85% yield) of the desired polycondensate, in the form of a white film-forming polymer with an inherent viscosity of 95 ml. g.$^{-1}$, and the thermal decomposition zone of which lies between 395 and 460° C.

EXAMPLE 3

Polycondensation of 6,6'-bi-(2-chloro benzothiazolyl) sulphone (Formula II, where J= —$SO_2$—) with 4,4'-dihydroxy biphenyl (Formula III, where J' is a simple covalent bond).

1002 mg. of 6,6'-bi-(2-chloro benzothiazolyl) sulphone and 465 mg. of 4,4'-dihydroxy biphenyl are polycondensed at 145° C. in o-dimethoxybenzene, in the presence of anhydrous sodium carbonate (four times the theoretical amount needed), producing 940 mg. (73% yield) of the desired polycondensate. It is a film-forming polymer with an inherent viscosity of 68 ml. $g.^{-1}$, and the thermal decomposition zone of which lies between 430 and 527° C.

EXAMPLE 4

Polycondensation of 5,5'-bi-(2-chloro benzothiazolyl) sulphone (Formula I, where J= —$SO_2$—) with 4,4'-dihydroxy biphenyl (Formula III, where J' is a simple covalent bond).

1002 mg. of 5,5'-bi-(2-chloro benzothiazolyl) sulphone and 465 mg. of 4,4'-dihydroxy biphenyl are polycondensed at 160° C. in o-dimethoxybenzene, in the presence of anhydrous sodium carbonate (four times the theoretical amount needed), producing 900 mg. (71% yield) of the desired polycondensate. It is a polymer, solutions of which have varnish properties. The inherent viscosity is 31 ml. $g.^{-1}$, and its thermal degradation zone lies between 470 and 558° C.

EXAMPLE 5

Polycondensation of 5,5'-bi-(2-chloro benzothiazolyl) sulphone (Formula I, where J= —$SO_2$—) with 4,4'-dihydroxy diphenylsulphone (Formula III, where J'= —$SO_2$—).

1002 mg. of 5,5'-bi-(2-chloro benzothiazolyl) sulphone and 625 mg. of 4,4'-dihydroxy diphenylsulphone are polycondensed at 160° C. in o-dimethoxybenzene, in the presence of anhydrous sodium carbonate (four times the theoretical amount needed), producing 970 mg. (60% yield) of the desired polycondensate. Solutions of this polymer deposit a varnish after evaporation. The inherent viscosity is 30 ml. $g.^{-1}$, and its thermal decomposition zone lies between 440 and 530° C.

EXAMPLE 6

Polycondensation of 6,6'-bi-(2-chloro benzothiazolyl) (Formula II, where J is a simple covalent bond) with 4,4'-dihydroxy biphenyl (Formula III, where J' is also a covalent bond).

842 mg. of 6,6'-bi-(2-chlorobenzothiazolyl) and 465 mg. of 4,4'-dihydroxy biphenyl are polycondensed at 155° C. in o-dimethoxybenzene, in the presence of anhydrous sodium carbonate (four times the amount theoretically needed), producing 790 mg. (70% yield) of the desired polycondensate. It is a film-forming polymer with an inherent viscosity of 42 ml. $g.^{-1}$, and the thermal decomposition zone of which lies between 456 and 508° C.

EXAMPLE 7

Preparation of 6,6'-bi-(2-N-piperidino benzothiazolyl) sulphone.

This example illustrates the reactivity, with regard to amines, of the two chlorine atoms in 6,6'-bi-(2-chlorobenzothiazolyl) sulphone.

2 g. (0.005 mole) of 6,6'-bi-(2-chloro benzothiazolyl) sulphone are dissolved in 50 ml. of tetrahydrofuran heated to boiling point, and 850 mg. (0.01 mole) of anhydrous piperidin are added. After two hours' reflux, it is allowed to cool, and the resulting product, which has precipitated, is isolated. The product is a white solid, which melts at 272° C. The operation gives 100% yield.

TABLE I

| Nature of polycondensate | | Reaction conditions | | | | Properties of polycondensate | | |
| --- | --- | --- | --- | --- | --- | --- | --- | --- |
| J | J' | Solvent | Percent $CO_3Na_2$ [a] | Temp. (° C.) | Yield (percent) | $\eta$inh (ml.$g.^{-1}$)[b] | Zone of degradation (° C.)[c] | Application |
| —$SO_2$— (6,6') | —$SO_2$— | o-Dimethoxybenzene | 250 | 145 | 73 | 77 | 420–530 | Film. |
| —$SO_2$— (6,6') | $\begin{array}{c}CH_3\\|\\C\\|\\CH_3\end{array}$ | Pseudocumene | 200 | 155 | 85 | 95 | 395–460 | Do. |
| —$SO_2$— (6,6') | Covalent bond | o-Dimethoxybenzene | 400 | 145 | 33 | 68 | 430–527 | Do. |
| —$SO_2$— (5,5') | do | do | 400 | 160 | 71 | 31 | 470–558 | Varnish. |
| —$SO_2$— (5,5') | —$SO_2$— | do | 400 | 160 | 60 | 30 | 440–530 | Do. |
| Covalent bond (6–6') | Covalent bond | do | 400 | 155 | 70 | 42 | 456–508 | Film. |

Characteristics of the polycondensates described in examples:
[a] Quantity of anhydrous sodium carbonate added, expressed as a percent of the amount theoretically needed to neutralize the hydrochloric acid produced.
[b] Inherent viscosity measured in a solution in dichloracetic acid and containing 0.5 g. polymer in 100 ml. solvent.
[c] Heat decomposition zone defined as indicated in the text.

What is claimed is:

1. A member selected from the group consisting of film forming polycondensates consisting essentially of repeating units of the formulae:

$$\left[ \begin{array}{c} \text{structure 1} \end{array} \right]$$

and $$\left[ \begin{array}{c} \text{structure 2} \end{array} \right]$$

wherein J is a member selected from the group consisting of $SO_2$ and a covalent bond and J' is a member selected from a group consisting of $SO_2$, a covalent bond, and $$-\underset{\underset{CH_3}{|}}{\overset{\overset{CH_3}{|}}{C}}-$$

2. A polycondensate according to claim 1 consisting essentially of repeating units of the following structural formula:

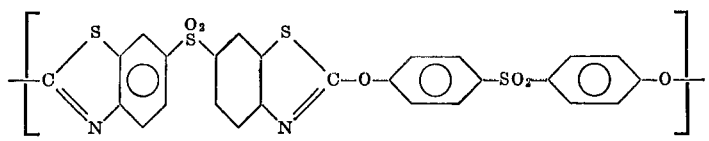

3. A polycondensate according to claim 1 consisting essentially of repeating units of the following structural formula:

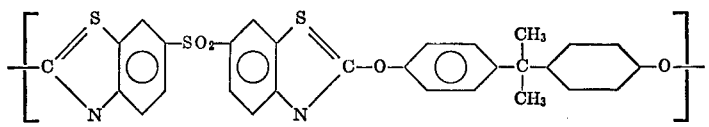

4. A polycondensate according to claim 1 consisting essentially of repeating units of the following structural formula:

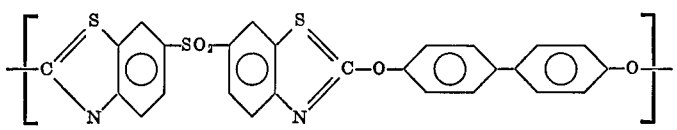

5. A polycondensate according to claim 1 consisting essentially of repeating units of the following structural formula:

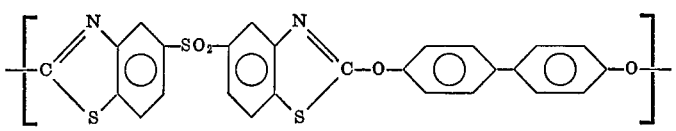

6. A polycondensate according to claim 1 consisting essentially of repeating units of the following structural formula:

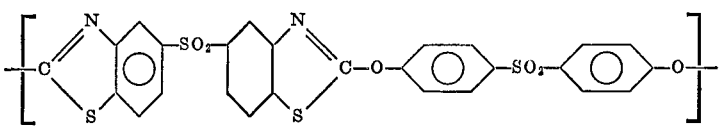

7. A polycondensate according to claim 1 consisting essentially of repeating units of the following structural formula:

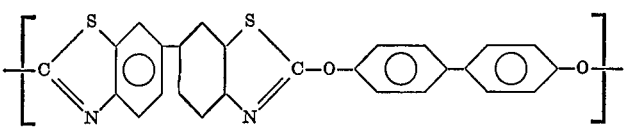

8. A process for the production of the polycondensate according to claim 1 comprising reacting a compound selected from the group consisting of dibenzothiazolic derivatives having a 5,5' junction of the formula

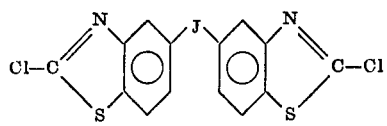

wherein J is a member selected from the group consisting of $SO_2$ and a covalent bond—and a dibenzothiazolic derivative with a 6,6' junction of the formula

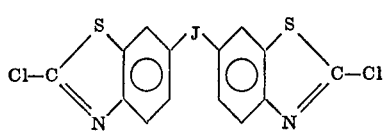

wherein J is as defined above—with a compound of the formula

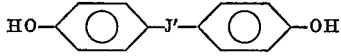

wherein J' is a member selected from the group consisting of $SO_2$, a covalent bond and

in an inert solvent at a temperature of about 130° to 180° C. in the presence of an acid acceptor, under substantially anhydrous conditions and in a nitrogen atmosphere, for 100 to 150 hours.

9. A process according to claim 8 wherein said solvent is a member selected from the group consisting of hydrocarbons and an aprotic liquid having a boiling point in excess of 180° C.

10. A process according to claim 8 wherein said acid acceptor is a member selected from the group consisting of tertiary amines with low volatility, alkaline-earth oxides and alkaline-earth salts.

References Cited

UNITED STATES PATENTS

| 3,267,081 | 8/1966 | Rudner et al. | 260—78.4 |
| 3,397,187 | 8/1968 | Mecum | 260—79 |
| 3,424,720 | 1/1969 | Rudner et al. | 260—47 |

WILLIAM H. SHORT, Primary Examiner

L. L. LEE, Assistant Examiner

U.S. Cl. X.R.

117—161 UN; 260—31.2 N, 33.4 P, 61, 79 R